United States Patent
Shu et al.

(10) Patent No.: US 8,499,028 B2
(45) Date of Patent: Jul. 30, 2013

(54) DYNAMIC EXTENSIBLE LIGHTWEIGHT ACCESS TO WEB SERVICES FOR PERVASIVE DEVICES

(75) Inventors: Chen Shu, Southbury, CT (US); Michael Van Der Meulen, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 1383 days.

(21) Appl. No.: 11/063,708

(22) Filed: Feb. 23, 2005

(65) Prior Publication Data

US 2006/0190580 A1   Aug. 24, 2006

(51) Int. Cl.
    G06F 15/16   (2006.01)
(52) U.S. Cl.
    USPC .................. 709/202; 709/217; 709/246
(58) Field of Classification Search
    USPC ............ 709/202, 203, 218, 227, 228, 229, 709/230, 232, 244, 250
    See application file for complete search history.

(56) References Cited

U.S. PATENT DOCUMENTS

| | | | | |
|---|---|---|---|---|
| 5,815,148 A * | 9/1998 | Tanaka | | 715/746 |
| 6,076,109 A * | 6/2000 | Kikinis | | 709/228 |
| 6,834,341 B1 * | 12/2004 | Bahl et al. | | 713/156 |
| 6,901,428 B1 * | 5/2005 | Frazier et al. | | 709/203 |
| 6,931,429 B2 * | 8/2005 | Gouge et al. | | 709/203 |
| 6,934,684 B2 * | 8/2005 | Alpdemir et al. | | 704/265 |
| 7,020,685 B1 * | 3/2006 | Chen et al. | | 709/204 |
| 7,092,370 B2 * | 8/2006 | Jiang et al. | | 370/329 |
| 7,103,313 B2 * | 9/2006 | Heinonen et al. | | 455/41.2 |
| 7,127,494 B1 * | 10/2006 | Aronsson | | 709/217 |
| 7,180,527 B2 * | 2/2007 | Sakai et al. | | 345/629 |
| 7,181,438 B1 * | 2/2007 | Szabo | | 707/2 |
| 7,266,582 B2 * | 9/2007 | Stelting | | 709/201 |
| 7,295,838 B2 * | 11/2007 | Bhakta et al. | | 455/418 |
| 7,349,949 B1 * | 3/2008 | Connor et al. | | 709/217 |
| 7,409,674 B2 * | 8/2008 | Shenfield et al. | | 717/114 |
| 7,490,171 B2 * | 2/2009 | Saint-Hilaire et al. | | 709/249 |
| 7,502,833 B2 * | 3/2009 | Schaeck | | 709/217 |
| 7,519,397 B2 * | 4/2009 | Fournier et al. | | 455/563 |
| 7,562,127 B2 * | 7/2009 | Sakamoto et al. | | 709/219 |

(Continued)

FOREIGN PATENT DOCUMENTS

EP     0 779 759 A2     6/1997
WO    WO 02/23857 A2    3/2002

OTHER PUBLICATIONS

European Patent Office, Patent Cooperation Treaty, International Searching Authority, International Application No. PCT/EP2006/060109, Applicant's file reference POU050008, International filed Feb. 20, 2006, date of mailing May 18, 2006, 12 pages.

*Primary Examiner* — John Follansbee
*Assistant Examiner* — Madhu Woolcock
(74) *Attorney, Agent, or Firm* — Fleit Gibbons Gutman Bongini & Bianco PL; Thomas Grzesik

(57) ABSTRACT

A Generic Mobile Web Services (GMWS) manager provides mobile clients with access to Web Services. The GMWS manager provides an interface between Web Services and mobile clients (hand held PDAs for example). The GMWS manager maintains a registry of supported Web Services and metadata attributes about the Web Services and the mobile client. Information is transferred between a client and a registered web service by way of the GMWS manager based on attributes available to the GMWS manager.

21 Claims, 13 Drawing Sheets

U.S. PATENT DOCUMENTS

| | | | |
|---|---|---|---|
| 7,596,218 B2 * | 9/2009 | Montemer | 379/218.01 |
| 7,596,622 B2 * | 9/2009 | Owen et al. | 709/230 |
| 7,647,164 B2 * | 1/2010 | Reeves | 701/200 |
| 7,669,212 B2 * | 2/2010 | Alao et al. | 725/32 |
| 7,698,398 B1 * | 4/2010 | Lai | 709/223 |
| 7,725,560 B2 * | 5/2010 | Bales et al. | 709/217 |
| 7,747,699 B2 * | 6/2010 | Prueitt et al. | 709/219 |
| 7,870,221 B2 * | 1/2011 | Matveief et al. | 709/217 |
| 8,135,843 B2 * | 3/2012 | Kramer | 709/227 |
| 8,214,342 B2 * | 7/2012 | Meiresonne | 707/705 |
| 2001/0016880 A1 | 8/2001 | Cai et al. | |
| 2002/0111848 A1 * | 8/2002 | White | 705/10 |
| 2002/0174117 A1 | 11/2002 | Nykanen | 707/4 |
| 2003/0054810 A1 | 3/2003 | Chen et al. | |
| 2003/0088421 A1 | 5/2003 | Maes et al. | 704/270.1 |
| 2003/0191868 A1 | 10/2003 | Espino | 709/328 |
| 2003/0195871 A1 * | 10/2003 | Luo et al. | 707/3 |
| 2003/0236821 A1 * | 12/2003 | Jiau | 709/203 |
| 2004/0003130 A1 * | 1/2004 | Becker et al. | 709/311 |
| 2004/0017392 A1 * | 1/2004 | Welch | 345/738 |
| 2004/0030490 A1 * | 2/2004 | Hegedus et al. | 701/200 |
| 2004/0030627 A1 | 2/2004 | Sedukhin | 705/36 |
| 2004/0030740 A1 | 2/2004 | Stelting | 709/201 |
| 2004/0054690 A1 * | 3/2004 | Hillerbrand et al. | 707/104.1 |
| 2004/0075675 A1 * | 4/2004 | Raivisto et al. | 345/700 |
| 2004/0078424 A1 * | 4/2004 | Yairi et al. | 709/203 |
| 2004/0093580 A1 | 5/2004 | Carson et al. | 717/101 |
| 2004/0128342 A1 | 7/2004 | Maes et al. | 709/200 |
| 2004/0139151 A1 | 7/2004 | Flurry et al. | 709/203 |
| 2004/0143649 A1 | 7/2004 | Feng et al. | 709/219 |
| 2004/0148370 A1 | 7/2004 | Sadiq | 709/223 |
| 2004/0176958 A1 | 9/2004 | Salmenkaita et al. | 704/275 |
| 2004/0199614 A1 * | 10/2004 | Shenfield et al. | 709/220 |
| 2005/0138362 A1 * | 6/2005 | Kelly et al. | 713/156 |
| 2005/0198304 A1 * | 9/2005 | Oliver et al. | 709/227 |
| 2005/0251501 A1 * | 11/2005 | Phillips et al. | 707/2 |
| 2006/0167748 A1 * | 7/2006 | Hartmann et al. | 705/14 |
| 2006/0184878 A1 * | 8/2006 | Argo et al. | 715/700 |
| 2006/0236651 A1 * | 10/2006 | Graf | 52/750 |

\* cited by examiner

DYNAMIC EXTENSIBLE LIGHTWEIGHT ACCESS TO WEB SERVICES FOR PERVASIVE DEVICES

FIELD OF THE INVENTION

The present invention is related to Web Services and is more particularly related to providing efficient client access to Web Services for pervasive devices.

BACKGROUND OF THE INVENTION

With the growing popularity of pervasive devices and the increasing bandwidth of wireless communications, users want to have access to more services at their finger tips while traveling without a PC. For example, a mobile salesperson may need services such as company inventory lookup, customer order status check, customer address lookup, etc.

A Web service is a software system identified by a URI, whose public interfaces and bindings are defined and described using XML. Its definition can be discovered by other software systems. These systems may then interact with the Web service in a manner prescribed by its definition, using XML based messages conveyed by Internet protocols.

Traditionally, developers had to write a program to enable the access to a web service. For non-developers, it's very difficult for them to find a program for each web service that they need to access. Also, writing a program for each web service results in substantial cost in developing and support.

US Patent Application Pub. No. 2004/0176958A1, "SYSTEM AND METHOD FOR MULTIMODAL SHORT-CUTS TO DIGITAL SERVICES" filed Feb. 4, 2002, incorporated herein by reference, describes a method and system for facilitating user access to services through a wireless device of a user, involves recommending to a user a subset of services from a plurality of services available to the user in which each recommended service of the subset has at least one voice short-cut associated therewith, and selecting a service to be accessed through the user's wireless device from the subset of services according to a voice command by the user corresponding to the voice short-cut of the service.

US Patent Application Pub. No. 2004/0139151A1, "APPARATUS AND METHOD FOR SELECTING A WEB SERVICE IN RESPONSE TO A REQUEST FROM A CLIENT DEVICE" filed Dec. 17, 2002, incorporated herein by reference, describes An apparatus and method for selecting a web service in response to a request from a client device are provided. With the apparatus and method of the present invention, when an a request is received from a client device for the invocation of a Web Services operation, the request is received in an off-ramp device coupled to an on-ramp device that provides an interface to Web Services. The off-ramp device verifies that the requested service is in a configuration file and then determines the selection scope of the desired service, as defined in the configuration file. Based on the selection scope of the desired service, the off-ramp can determine whether to perform discovery and selection of a service implementation ("request" selection scope), retrieve a service implementation from a session level cache ("session" selection scope), or retrieve a service implementation from an application level cache ("application" selection scope). If a service implementation corresponding to the requested service does not exist in the session or application level cache, the discovery and selection operations may be performed to identify a service implementation to handle the request and the service implementation may be stored in the appropriate cache.

US Patent Application Pub. No. 2004/0176958A1, "SYSTEM AND METHOD FOR PROVIDING MULTI-MODAL INTERACTIVE STREAMING MEDIA APPLICATIONS" filed Dec. 31, 2002, incorporated herein by reference, describes a method and system for facilitating user access to services through a wireless device of a user, involves recommending to a user a subset of services from a plurality of services available to the user in which each recommended service of the subset has at least one voice short-cut associated therewith, and selecting a service to be accessed through the user's wireless device from the subset of services according to a voice command by the user corresponding to the voice short-cut of the service.

US Patent Application Pub. No. 2004/0030740A1 "METHOD AND SYSTEM FOR AUTOMATING GENERATION OF WEB SERVICES FROM EXISTING SERVICE COMPONENTS" filed Aug. 9, 2002, incorporated herein by reference, describes a computer-based method for generating a Web service. The method includes identifying first and second service components for inclusion in the Web service, which includes locating available services using service detectors that use differing search techniques and displaying the located services to the user to allow the user to make a selection to identify the first and second service components. The method continues with generating a description or contract for the Web service defining service behavior including invoking rules. A transport structure is then created for accessing the new Web service such as a transmission envelope. The Web service is advertised as being available on the communications network including registering the Web service with a services registry linked to the communications network.

US Patent Application Pub. No. 2003/0088421A1 "UNIVERSAL IP-BASED AND SCALABLE ARCHITECTURES ACROSS CONVERSATIONAL APPLICATIONS USING WEB SERVICES FOR SPEECH AND AUDIO PROCESSING RESOURCES" filed Jun. 25, 2002, incorporated herein by reference, describes systems and methods for conversational computing and, in particular, to systems and methods for building distributed conversational applications using a Web Services-based model wherein speech engines (e.g., speech recognition) and audio I/O systems are programmable services that can be asynchronously programmed by an application using a standard, extensible SERCP (speech engine remote control protocol), to thereby provide scalable and flexible IP-based architectures that enable deployment of the same application or application development environment across a wide range of voice processing platforms and networks/gateways (e.g., PSTN (public switched telephone network), Wireless, Internet, and VoIP (voice over IP)). Systems and methods are further provided for dynamically allocating, assigning, configuring and controlling speech resources such as speech engines, speech pre/post processing systems, audio subsystems, and exchanges between speech engines using SERCP in a web service-based framework.

US Patent Application Pub. No. 2004/0030627A1 "WEB SERVICES BROKER" filed Apr. 18, 2003, incorporated herein by reference, describes a web service broker method comprises providing an interface between an enterprise and at least one of a service client and a service provider, the service client discovering Web Services on a service registry and using corresponding Web Services from the service provider, communicating between the enterprise and the at least one of the service client and the service provider and performing at least one of a) converting information from/to the enterprise to a form appropriate for the at least one of the service client and the service provider and b) converting information from/ to the at least one of the service client and the service provider to a form appropriate for the enterprise.

US Patent Application Pub. No. 2002/0174117A1 "MOBILE WEB SERVICES" filed May 15, 2001, incorporated herein by reference, describes a method is disclosed to enable a mobile phone or wireless PDA to discover Internet businesses and services by accessing the Universal Description, Discovery and Integration (UDDI) registry. The method facilitates the formation of a query to the UDDI registry for the wireless device user. The method constructs a personal user profile of the user's UDDI searching strategies and Internet accessing preferences. The user profile can be used as a shortcut for online or offline queries to the UDDI registry or for accessing pages from web sites, in response to the user's entry of abbreviated inputs to the wireless device. The method is embodied as programmed instructions which may be executed within the user's wireless device to query the UDDI registry. Alternately, method is embodied as programmed instructions which may be executed within a separate knowledge engine server to query the UDDI registry in response to commands from the user's wireless device. The server can be used to cache files accessed from web sites, for selective forwarding to the user's wireless device.

Browsers do not provide a means to access Web Services directly. Customized Web pages and programs have to be developed for each web service to be accessed. This results in substantial cost in developing and support. Furthermore, using a browser to access Web Services from web pages involves extra network RTT (round trip time) as the customized web page and programs must be downloaded before the browser is capable of accessing the Web Service. With the communication bandwidth limitation on pervasive devices, extra RTT has undesirable impact on the performance of the system.

Another approach is to make a customized client application that talks to the service for each web service. The disadvantage of this approach is that eventually the number of applications will outgrow the memory/storage limit of the device as the services increase. The total cost to develop, support and purchase each application is substantial.

SUMMARY OF THE INVENTION

The present invention recognizes that portable hand held devices (PDAs) could take advantage of a vast variety of services offered by Web Services if there were a way to register a subset group of Web Services of interest to the user of the PDA. Furthermore, it would be advantageous to relieve the PDA from burdensome communications overhead and complex resident applications in order to have access to Web Services.

The present invention provides a method and process to quickly enable dynamic extensible lightweight access to Web Services on pervasive devices.

The invention preferably comprises a server Generic Mobile Web Services (GMWS) Manager application running at a server. The GMWS Manager provides an interface between mobile devices and Web Services. The interface with the Web Services is preferably WSDL (Web Service Design Language).

Furthermore, the GMWS Manager maintains a Web Service Registry (WSR) which holds information about each web service that the GMWS Manager has access to on behalf of the mobile devices. The Web Service Registry preferably contains or has access to metadata that is used to provide the interfaces to both the Web Services and the Mobile Devices.

Preferably, the GMWS Manager is able to communicate with the Mobile devices in a variety of ways. The GMWS manager has access to a transcriber that transcribes voice, digital data, natural language and text to create Fast Path formatted structures to quickly access a particular web service. The mobile device preferably permits users to directly enter Fast Path formatted structures, bypassing the overhead of the transcriber function.

According to the invention, registered indication of one or more selected Web Services are stored in a local registry of the GMWS manager, the registered indication identifying the one or more selected Web Services. Furthermore, attributes of corresponding registered one or more selected Web Services are stored. Client requests are transformed to a form required by a first web service of the one or more selected Web Services based on the stored attributes. Client requests are forwarded to the first web service.

Furthermore, according to the invention, web service responses are transformed from the first web service based on the stored attributes to a form required by the client. Transformed web service responses are forwarded to the client.

A GUI representation of the registered one or more selected Web Services is presented to the client.

It is therefore, an object of the present invention to provide a dynamic extensible multimodal lightweight client solution to the Web Services so that the user can access multiple Web Services while requiring only a single application installation. By Multimodal we mean the user can use either text or voice as input. By Dynamic we mean the client will dynamically generate the GUI (graphical user interface) based on the attributes of the Web Services; it also means as the web service evolves, the client GUI will adapt to the changes dynamically without client code updates. By Extensible we mean new Web Services will automatically show up on the client's screen as they become available, without any manual client change.

It is a further object of the invention to authorizing the client permission to access the first web service.

It is another object of the invention to support client requests consisting of any one of voice, natural language text, digital data or Fast Path text.

It is another object of the invention to support attributes taken from the list of name of the first web service, description of the first web service, security requirement of the first web service, one or more keywords of the first web service, client name of the input field, client type of the input field, client default value of the input field and client flag to indicate if the field should be displayed.

It is another object of the invention to save a predefined number of client inputs received from the first client and provide predetermined portions of saved client inputs to the client.

It is another object of the invention to receive client input from the client, automatically transform the client input to a Fast Path form, the Fast Path form configured according to the stored attributes of a registered web service, and provide the Fast Path form of the client input to the client.

It is a further object of the invention to provide a way for multiple Web Services to be discovered and executed in multimodal mode (voice and/or text) from a single application on pervasive devices.

It is a further object of the invention to provide an automated "Fast Path" (semi-natural language) access to the web services from a mobile device.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE PREFERRED EMBODIMENTS

Due to the steady advances in technology, mobile computers are now available as palm-top or hand-held devices, such as personal digital assistants (PDAs), in-vehicle devices, business organizers, and the like. In addition, many people now utilize cellular telephones to access the Internet and to perform various other computing functions. Portable computing devices including, but not limited to, palm-tops, PDAs, and cellular telephones are often collectively referred to as "pervasive" or "mobile" computing devices.

Figure 1:
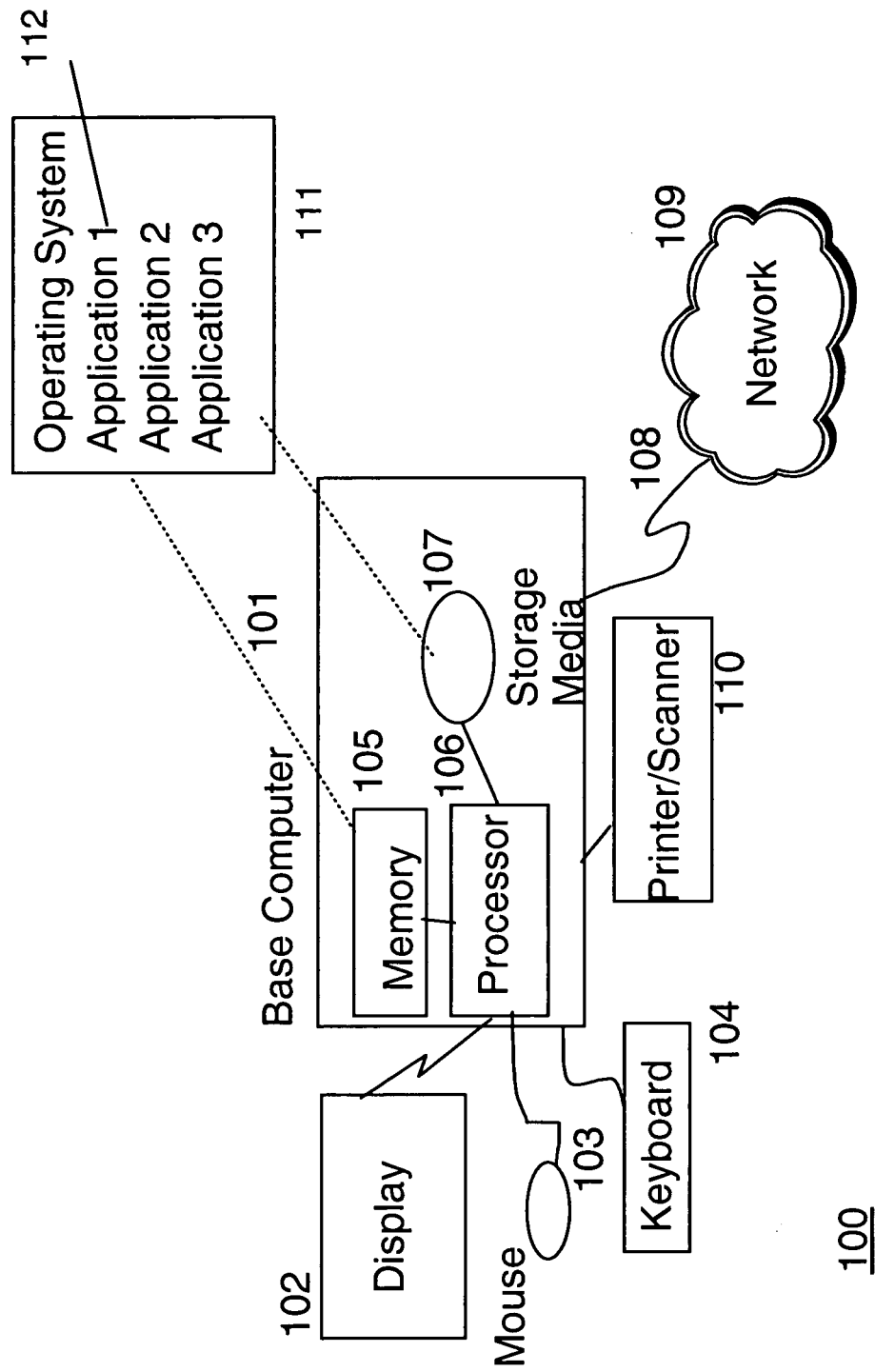
FIG. 1 is a diagram depicting example prior art elements of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
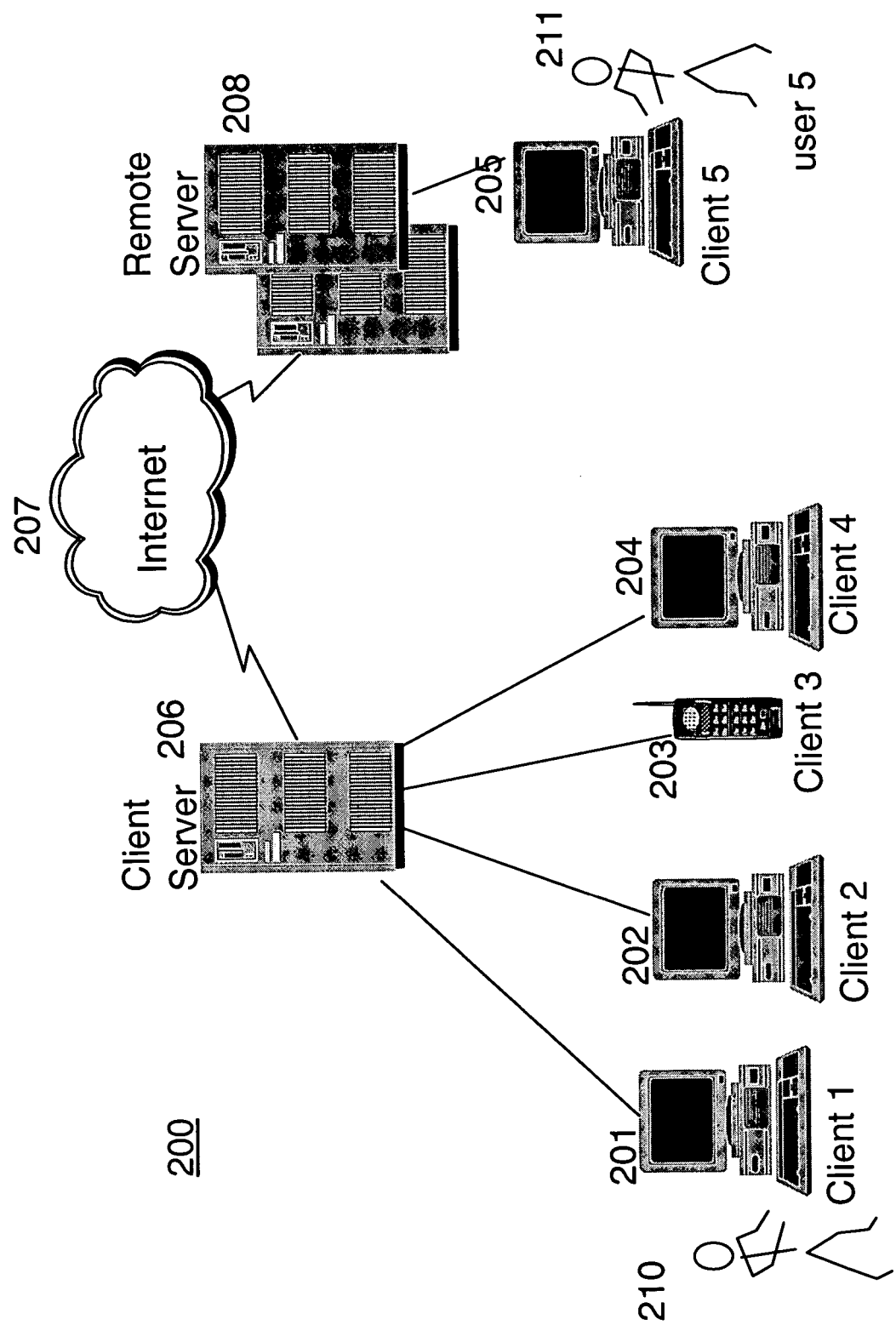
FIG. 2 is a diagram depicting example prior art elements of a computer network.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In a preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

The present invention provides Web Services by way of a server application to a mobile client device. The server application interprets keywords from the client device to a form compatible with a desired web service. Thus the client device requires minimal software knowledge of the web service as the server application manages the interfaces. Preferably, the server application has a list (registry) of supported Web Services and is able to provide the list to the client device. In a preferred embodiment, various forms of communications from the client device are supported. For example text or audio voice are supported whereby the server application provides a translator for translating voice into text or text into voice.

Figure 3:
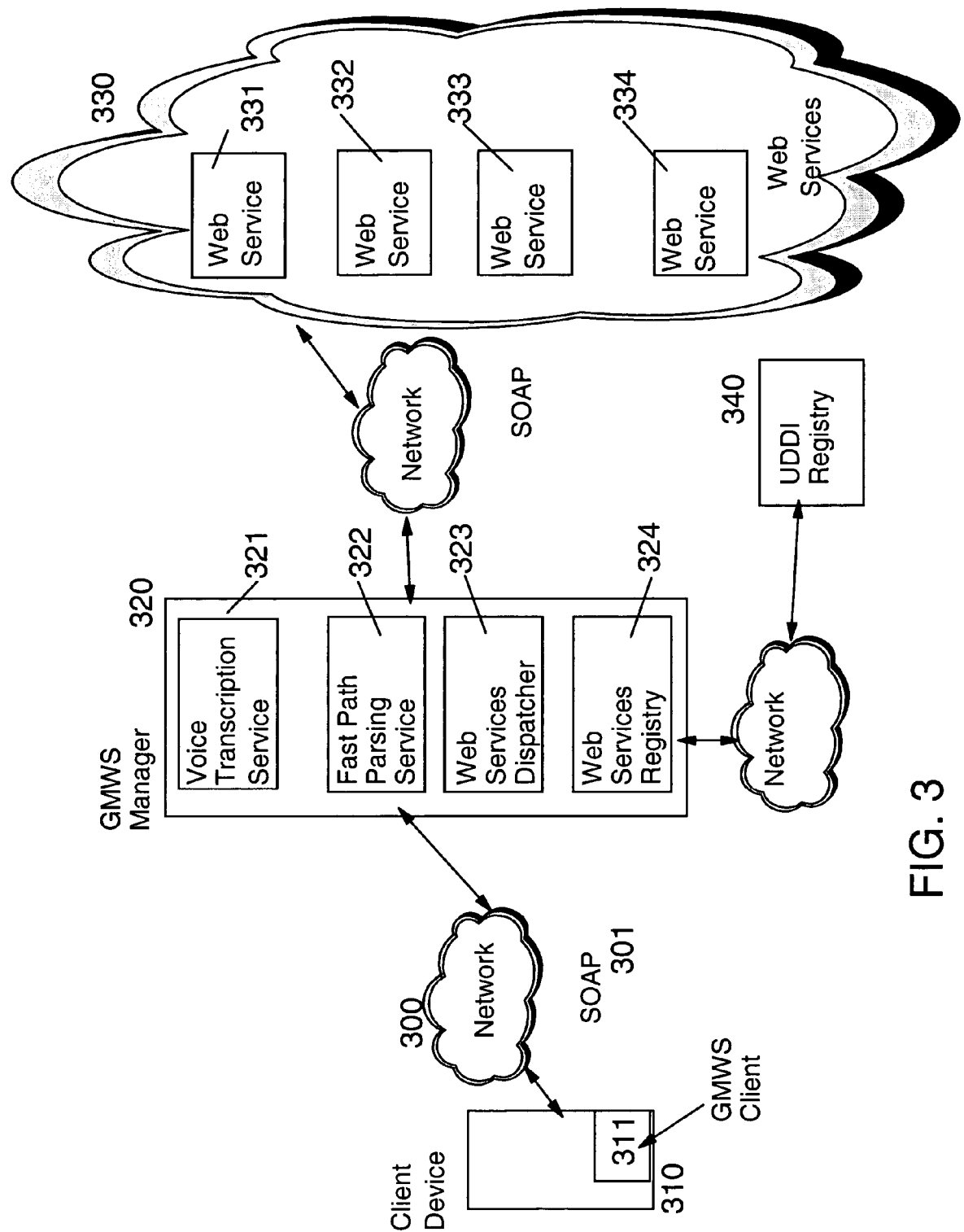
FIG. 3 is a diagram depicting example elements of an embodiment of the invention.

Referring now to FIG. 3, the present invention is implemented on a Client Device 310 (Preferably a mobile handheld computer or PDA for example) in communication with a Generic Mobile Web Services (GMWS) Manager 320. The GMWS Manager 320 has network access to Web Services 330 and a UDDI Registry 340. Preferably networks comprise the Internet. The communication protocol between 310 and 320, 320 and 330 are SOAP 301.

The SOAP Internet-Draft (search.ietf.org/internet-drafts/draft-box-http-soap-01.txt) provides the following example of a SOAP request:

```
1.  POST /StockQuote HTTP/1.1
2.  Host: www.stockquoteserver.com
3.  Content-Type: text/xml
4.  Content-Length: nnnn
5.  SOAPMethodName: Some-Namespace-URI#GetLastTradePrice
6.  <SOAP:Envelope xmlns:SOAP="urn:schemas-xmlsoap-
    org:soap.v1">
7.    <SOAP:Body>
8.      <m:GetLastTradePrice xmlns:m="Some-Namespace-URI">
9.   <symbol>DIS</symbol>
10.     </m:GetLastTradePrice>
11.   </SOAP:Body>
12. </SOAP:Envelope>
```

This request can be divided into 2 parts:
HTTP header (lines 1-5)
XML-RPC payload (lines 6-12, the SOAP:Envelope element)

Client Device 310 preferably employs an operating system such as MICROSOFT WINDOWS™, MICROSOFT WINDOWS CE, PALM OS™, and BLACKBERRY™.

Generic Mobile Web Services (GMWS) Client 311 (referred to as the client herein) resides in Client Device 310. It gets the Web Services metadata from GMWS Manager 320 and generates user interface for the user on the Client Device 310. It also sends the web service request to GMWS Manager 320.

The GMWS client 311 is preferably implemented in JAVA™ programming language as a standalone application installed on the device, which should provide a JVM™ (Java Virtual Machine).

GMWS Manager 320 includes four components: a Voice Transcription Service 321, a Fast Path Parsing Service 322, a Web Service Dispatcher 323 and a Web Service Registry 324.

Generic Mobile Web Services (GMWS) Manager is preferably implemented in JAVA programming language running as a server application in an Application Server, such as IBM WEBSPHERE™.

Fast Path Parsing Service 322 is used for parsing and converting Fast Path commands received from a client 311 into XML format. A Fast Path command is a semi-natural language sentence. It has keyword(s) and several input attributes for a web service. The multi-word attribute should be enclosed in quotes. The keywords and or command format is known to the GMWS Manager's Fast Path Parsing service 322.

In one embodiment user of a GMWS client 311 wishes to send a request to a search web service to search ACME Company's help desk number. The user can use the following Fast Path command:
search "what is acme help desk telephone number?"
Here "search" is the keyword for the search web service, and "what is acme help desk telephone number?" is the single attribute for the search web service.

In another embodiment a user wishes to check the status of a customer order, user enters the following text into his PDA client device 310 the following Fast Path command:
check order status "ACME" "order 123456"
Here "check order status" is the keyword for customer order status check web service, and "ACME" and "order 123456" are the two attributes for the customer order status check web service.

In one embodiment, the GMWS manager 320 accepts audio input. Here, a Voice Transcription Service 321 is used for transcribing a voice input to text. Voice Transcription Services are exemplified in U.S. patent application Ser. No. 10/979,334 "Method, System of Enabling Intelligent and Lightweight Speech to Text TRANSCRIPTION Through Distributed Environment" assigned to IBM, filed Nov. 2, 2004 and incorporated herein by reference.

In the embodiment, the user provides the Web Services request by speaking the Fast Path command into a microphone of the client device 310. The audio is sent from the Client Device 310 to the voice transcription service 321. Preferably the text transcription service 321 returns the text version of the voice request to the user's Client Device 310 to confirm accuracy so that the user can modify it if the transcription is not accurate (100% accurate). In an implementation, the GMWS Manager provides prompts or clues to the Client 311 when the received text appears to have syntax errors, incomplete statements or the like.

Web Services Registry (WSR) 324 contains the metadata information of managed mobile Web Services. Available Web Services 330 may include one or more web service 331-334. Each web service 331-334 can be registered with the Web Services Registry 324 by providing the following metadata:
1. Name of the web service
2. Category of the web service
3. Endpoint of the web service
4. Operation of the web service
5. Description of the web service
6. Name of the input and output field
7. Type of the input and output field
8. Default value of the input field if applicable 9. Keyword(s) of the first web service
10. Flag to identify whether or not to display the field to the user on Client Device 310
11. An XSL style sheet for output transformation if applicable
12. A template for Fast Path command parsing
13. Security requirement of the first web service The items 1 to 8 can also be obtained from a UDDI Registry 340 if the web service 331-334 has a Universal Description Discovery Interface (UDDI) entry. The WSR 324 will get information such as the request/response message format, service address etc. from the UDDI entry. The template for Fast Path Parsing can be implemented as a regular expression.

Web Services Dispatcher (WSD) 323 gets the web service request from the client 311. A request is sent from the client 311 in either xml format or Fast Path format.

An example XML request from client for Order Status Check web service is

```
<service name="check order status">
    <arg>ACME></arg>
    <arg>order 123456</arg>
</service>
```

If the text is in Fast Path format, the text will be sent to Fast Path Parsing Service 322 to get parsed and converted to XML format.

Web Services Dispatcher 323 is also responsible for invoking the web service 331-334 after receiving the request from the client. A preprocess may be applied to add in any hidden input fields before invoking the Web Services 330. After a response is received from the web service 331-334, the response may be transformed by the Web Services Dispatcher 323 to a form acceptable by the client 311 and then transferred back to the client 311.

Figure 4:
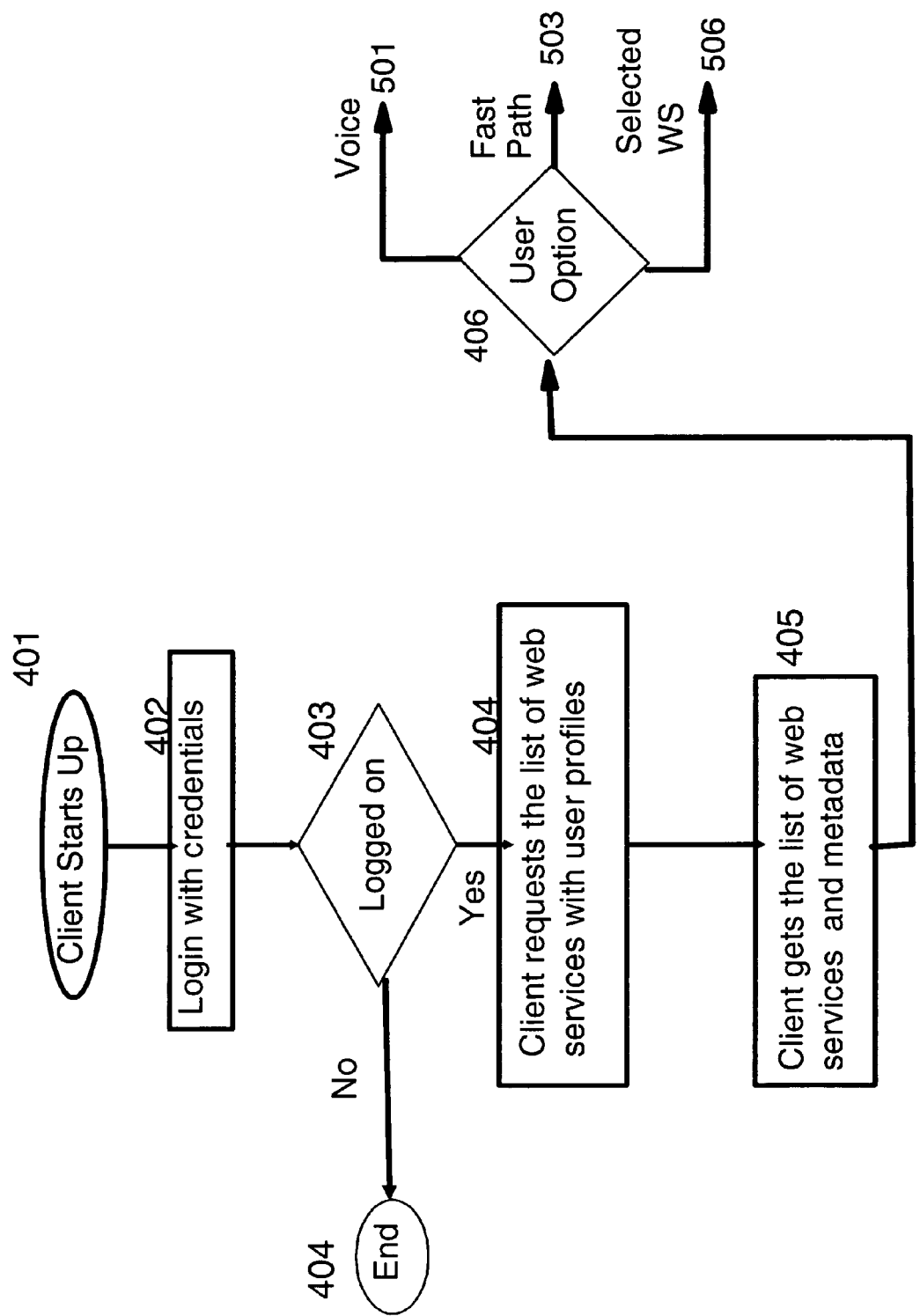
FIGS. 4 and 5 are flows depicting steps for a client on a pervasive device accessing a web service.

Referring to FIG. 4, an embodiment of a Client 311 logging into the GMWS services is shown. The user starts the GMWS client application 401 at his Client Device 310. The user provides his credentials (ID and Password) 402. (The credentials might be saved at the Client 311 such that they are automatically provided by the client software 311. The client 311 requests 404 a list of Web Services from the GMWS Manager 320 with user predefined profile. The client 311 receives a list of Web Services and metadata 405 from the GMWS Manager 320. The metadata received 405 is used by the client 311 to formulate communications to and from the GMWS Manager and to provide GUI structure. Preferably, a user can elect one of many 406 communications means to access a web service. For example, Voice, Fast Path (predetermined syntax rule text), natural language or by selecting a specific web service.

Figure 5:
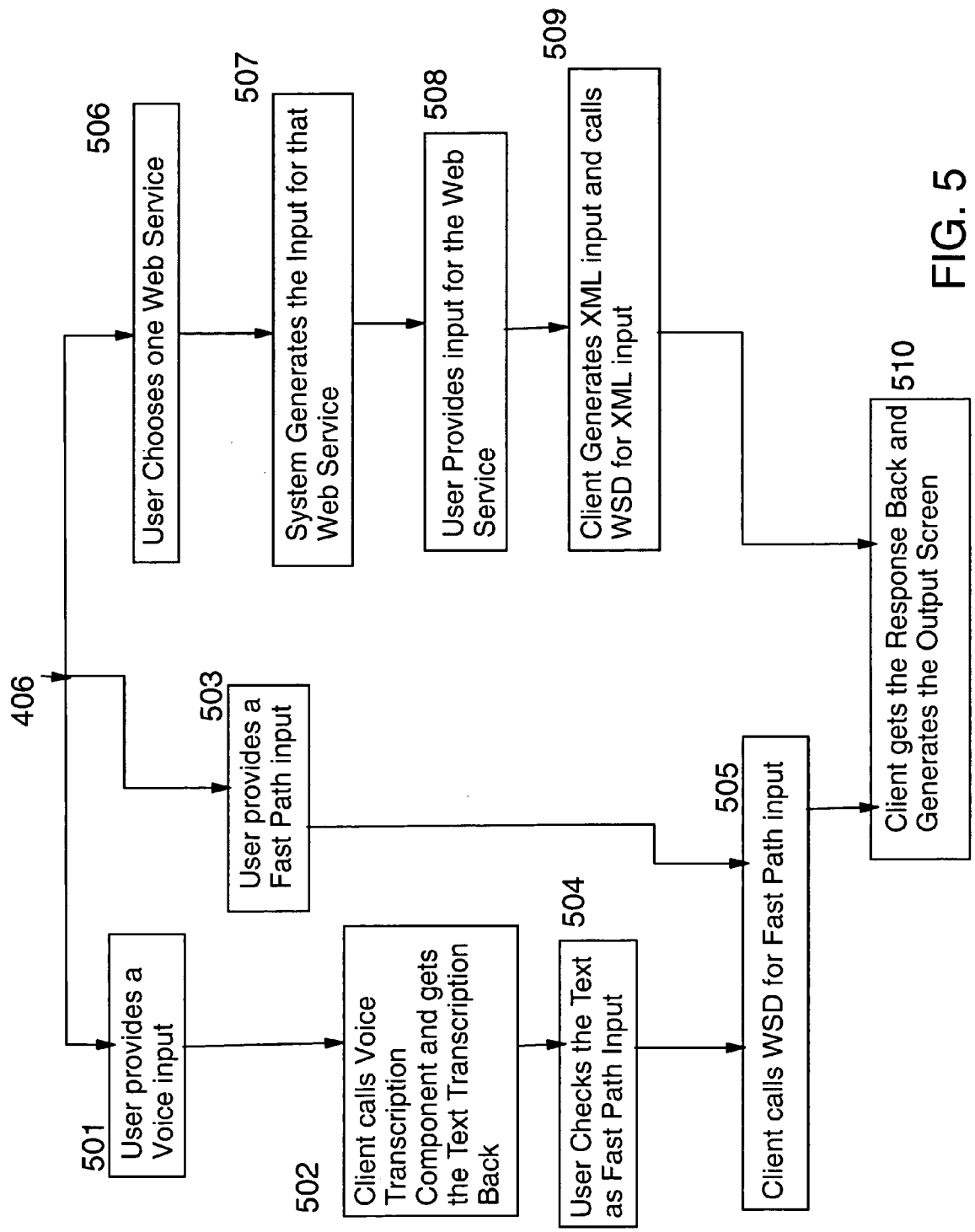

Referring to FIG. 5, the user may elect any of Voice input 501, Fast Path input 503 or a specific web service 506 for communications with the GMWS Manager 320. In the case of Voice input 501, the client calls 502 the Voice Transcription component and optionally receives the text version of his voice call. (Optionally, the user may receive a voice version of the text response). The user checks the response as Fast Path syntax 504. Optionally the user can make adjustments to his original syntax in light of the response text 502. The client 311 calls the WSD for Fast Path input 505. Finally, the client receives the response and generates a GUI display 510.

Optionally the user may have elected to provide Fast Path input 503, in which case his input is directed to WSD 505 to initiate the Web Service transaction. Finally, the client receives the response and generates a GUI display 510.

Optionally the user elects to select 506 a specific web service. The system generates 507 the input interface for that web service. The user provides 508 input which the client 311 uses to generate 509 XML input and calls WSD for XML input. Finally, the client receives the response and generates a GUI display 510.

Three flow examples will now teach elements of the present invention. Two versions of Fast Path access are shown, the first demonstrating an example of a Voice initiated transaction, the next demonstrating a Text initiated transaction. A third version demonstrates a GUI driven transaction. It should be noted that for the Fast Path transactions, the Fast Path language from the client determines not only the elements of the transaction but also which web service is being accessed. The GUI driven transaction provides a GUI assist at the client tailored to a specific web service.

Web Services 330 are selected for incorporation in the Web Services Registry 324 via WSDL. Many methods might be employed to populate the Web Services Registry. More than one Web Services Registry might be employed. In one embodiment, a group of subscribers share a Web Services Registry. In another embodiment, permission for individual Web Services of the Registry or permission to access one of a plurality of registries is defined at Login time 601-602. In another embodiment, a client negotiates for permission to access a web service of the list of Web Services when it initiates its first use of the web service.

Figure 6:
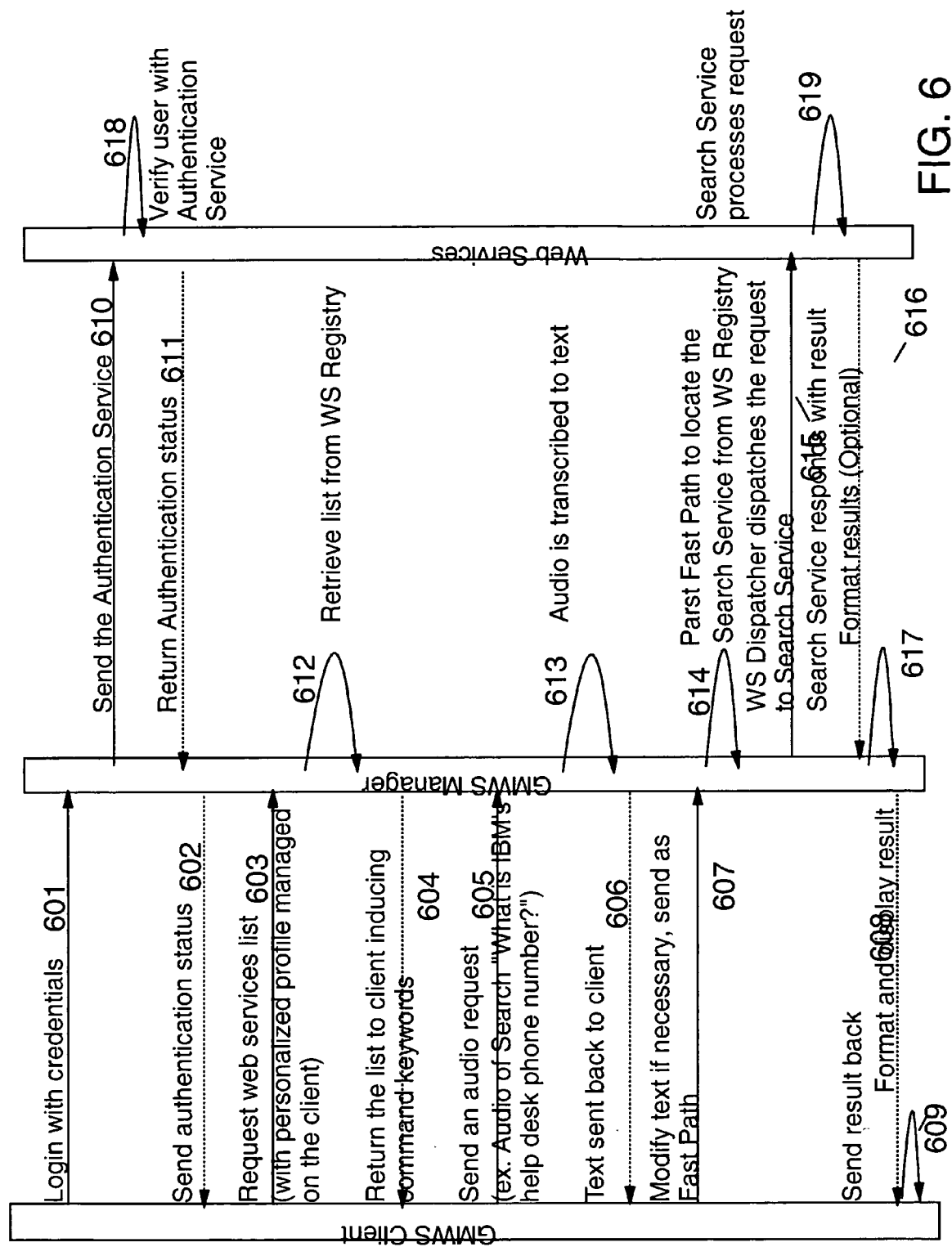
FIG. 6 is a flow depicting steps for a client on a pervasive device accessing a search web service in voice mode.

Preferably, each example transaction begins with the client being authenticated for the GMWS Manager 320. Referring to FIG. 6, the client sends 601 its login request along with credentials to GMWS Manager 320, which in turn invokes 610 the Authentication Web Service; the Authentication Web Service verifies 618 user's credential and returns 611 the status back to GMWS Manager 320. The client receives 602 the authentication status and if the authentication is successful, the client continues by sending 603 a request to the Web Service Dispatcher 323 for a Web Services list. The request 603 includes a personalized profile managed on the client. The personalized profile may in one embodiment be used by the GMWS Manager to determine which Web Services of the Registry 324 are authorized for the client to use. The list and metadata is retrieved from the Web Services Registry 612 and returned 604 to the client. The metadata supports the client 311 use of the Web Services on the list.

If the client 311 elects to transmit an Audio (Voice) request 605, the audio request is transcribed 613 by the Voice Transcription Service 321 into text. The text (or optionally a voice simulation of the text) is returned 606 to the client 311 so the user can verify that the audio was translated correctly before proceeding. If there is an error, the text is corrected and sent 607 back to the GMWS Manager 320 as Fast Path syntax. The Fast Path parsing service 322 locates the target web service 330 from the WS Registry 324 and causes the WS Dispatcher 323 to dispatch 615 the request to the target Web Service (Search service in the example). The Search Web Service processes 619 the request and sends a response 616 to the GMWS manager 320 which formats the response if needed 617 and returns 608 a result to the client 311 which formats and presents 609 the result at the client device 310.

Figure 7:
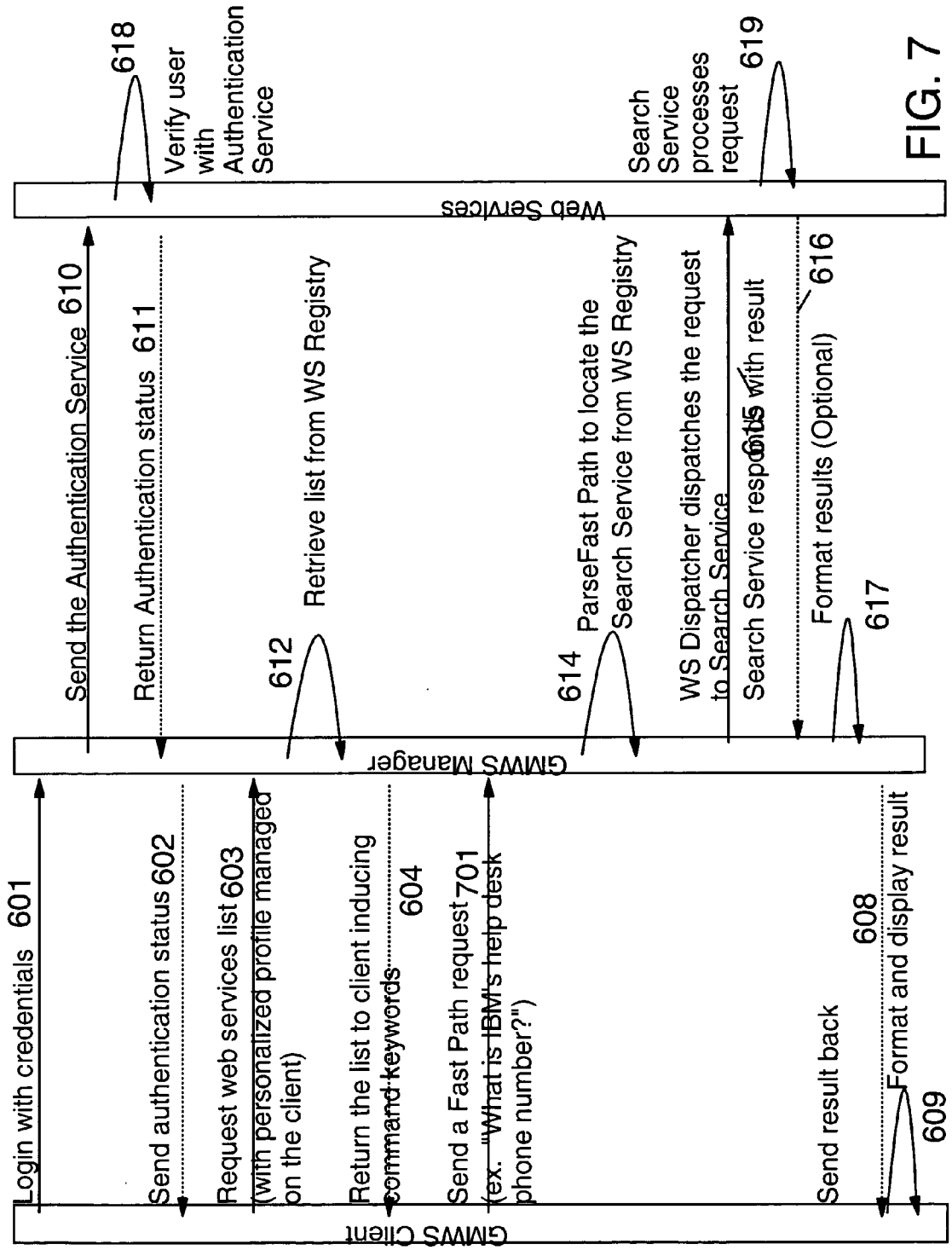
FIG. 7 is a flow depicting steps for a client on a pervasive device accessing a search web service in Fast Path.

Referring to FIG. 7, the steps up to 604 of the Audio example are the same as shown in FIG. 6. However, the client 311 elects to transmit Fast Path text rather than Audio, the Fast Path text request 701 is transmitted to the GMWS Manager 320 where it is parsed 614 by the Fast Path Parsing Service 322 to locate the Web Service from the WS Registry 324. The WS dispatcher 323 dispatches 615 the request to the selected (Search) Web Service 330 using metadata associated with the web Service. As in the example of FIG. 6, the Search Web Service processes 619 the request and sends a response 616 to the GMWS manager 320 which formats the response if needed 617 and returns 608 a result to the client 311 which formats and presents 609 the result at the client device 310.

Figure 8:
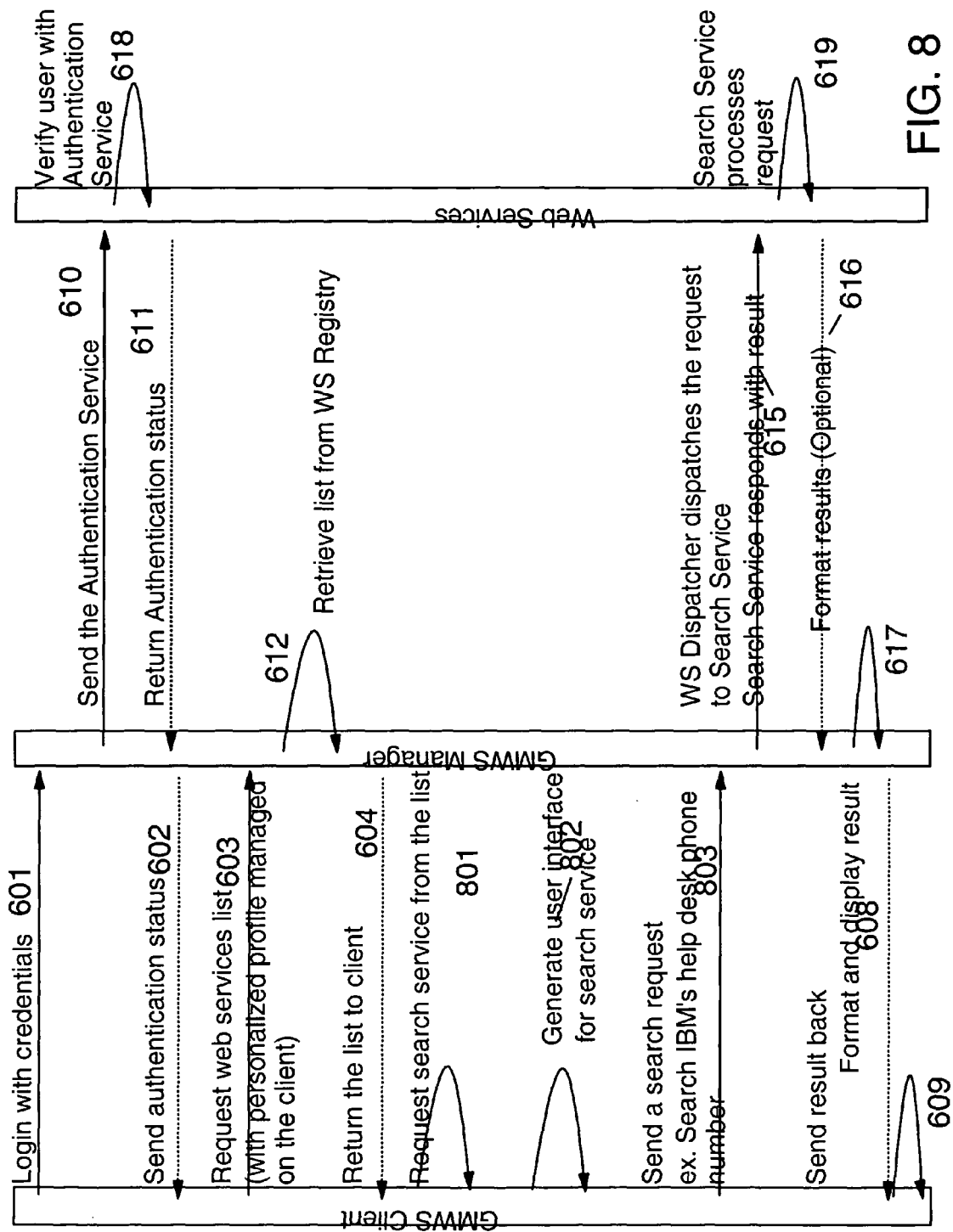
FIG. 8 is a flow depicting steps for a client on a pervasive device accessing a search web service from a list of Web Services.

Referring to FIG. 8, the steps up to 604 of the Audio example are the same as shown in FIG. 6. However, in this example, the user selects 801 one specific web service, such as the search web service, from the list. The client generates 802 the user interface of that search service based on the metadata dynamically. The user then fills the input values and sends 803 the service request to the Web Services Dispatcher 323. An example request as, putting "What is ACME help desk phone number?" in the generated question field on the interface. After getting the request, Web Services Dispatcher 323 dispatches the request 615 to the desired (Search) web service. The Search web service processes the search request 619, and sends 616 the results back to Web Services Dispatcher 323. Web Services Dispatcher 323 may format 617 the results if that's defined in the metadata for this web service. The results are then sent 608 back to the client 311. The client 311 further formats 609 the results and presents the results to the user.

Figure 9:
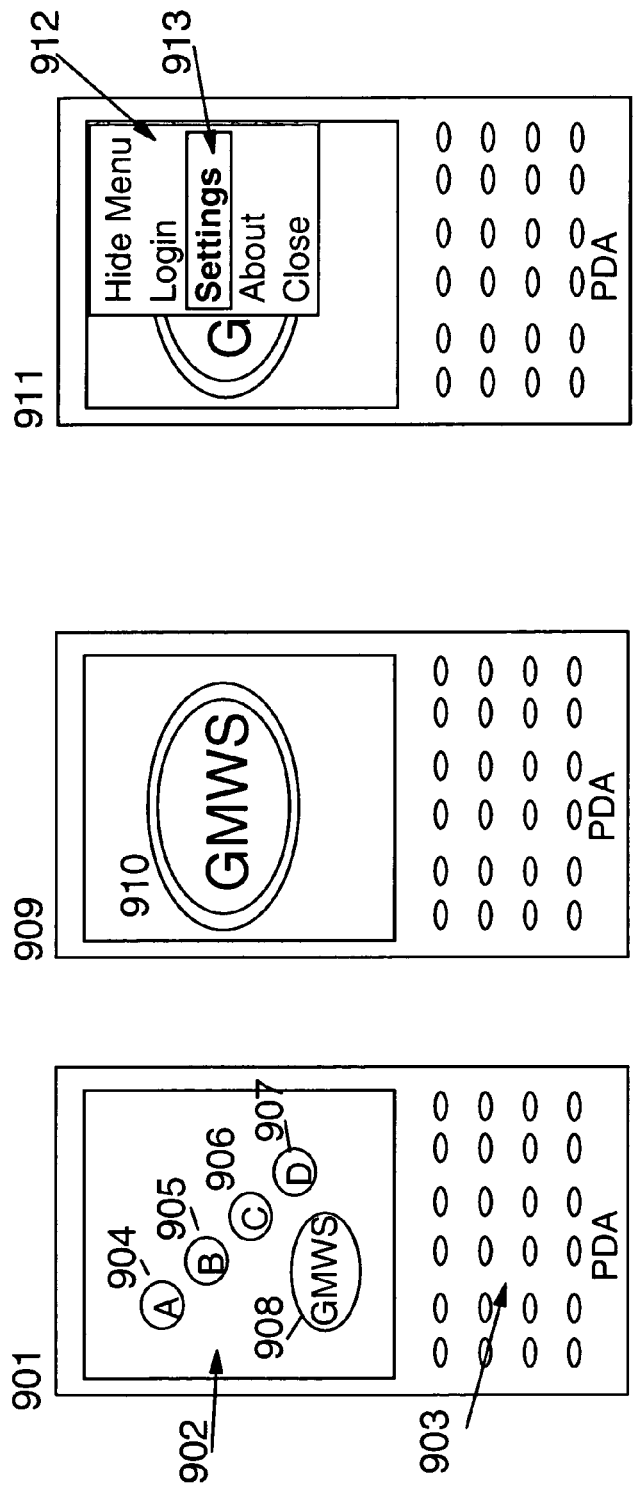
FIG. 9 is a PDA portrayed in 3 sequential views.
Figure 10:
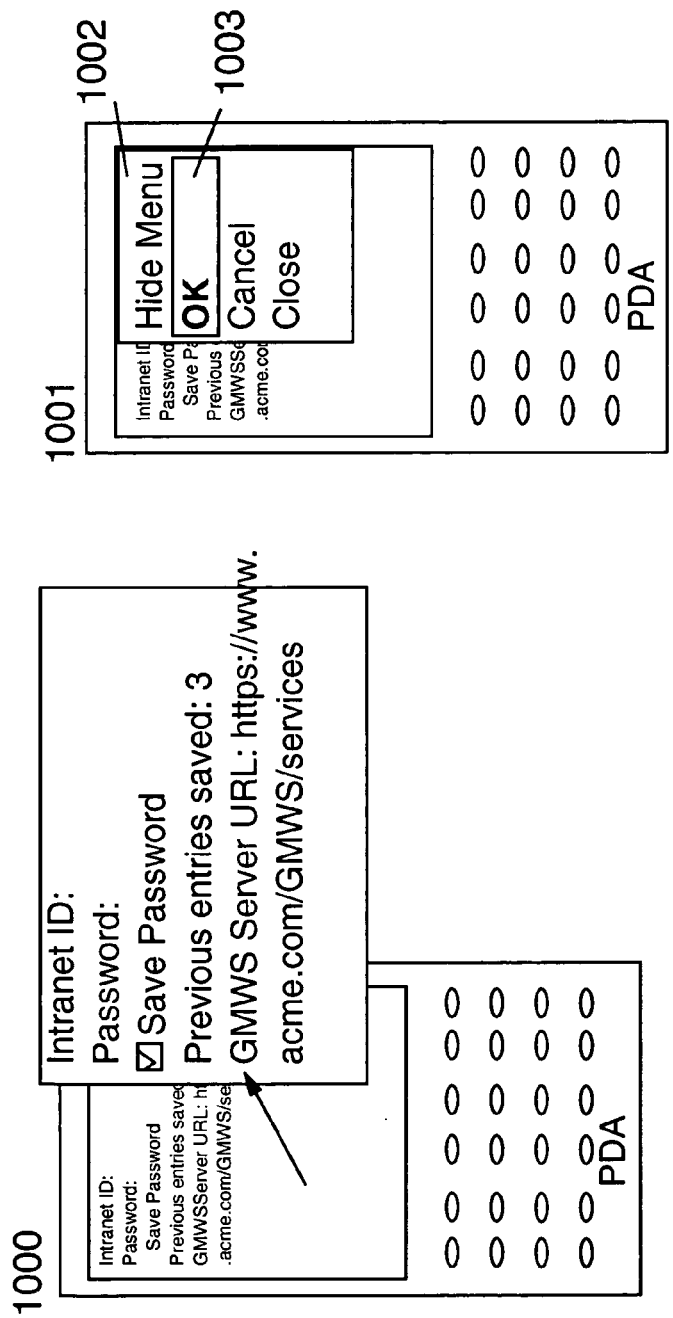
FIG. 10 is the PDA portrayed in 2 subsequent sequential views.
Figure 11:
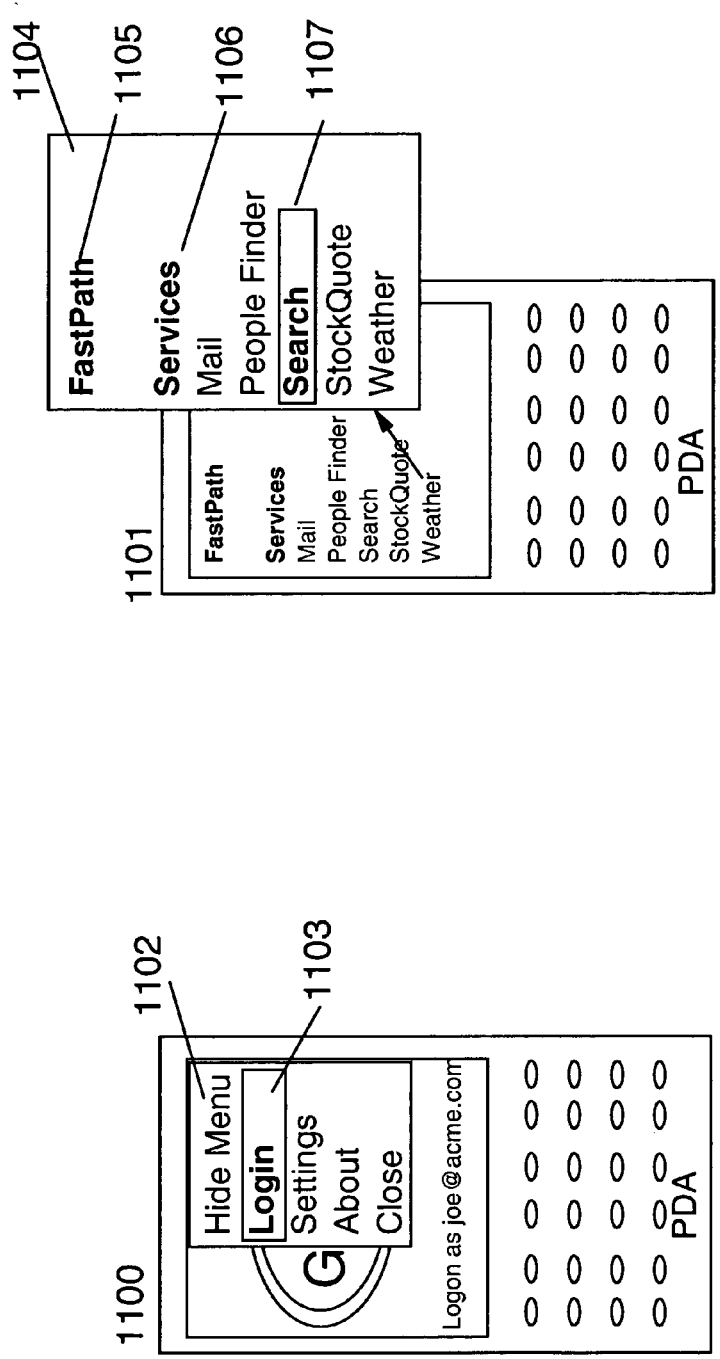
FIG. 11 is a PDA portrayed in 2 subsequent sequential views.
Figure 12:
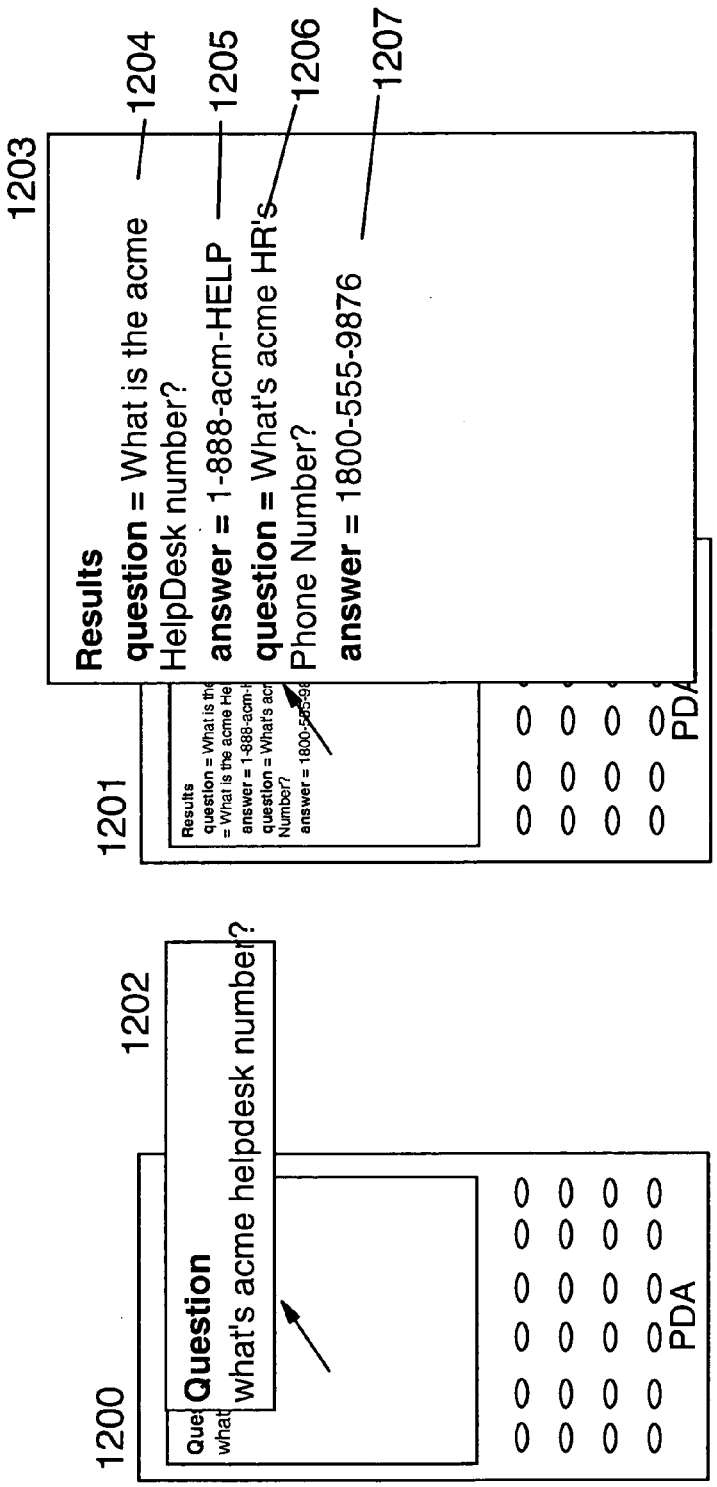
FIG. 12 is a PDA portrayed in 2 subsequent sequential views.

A user's view of an embodiment of the invention is shown beginning in FIG. 9. A Client Device 310 is shown as a PDA. The PDA 901 comprises a viewable area (screen) 902 and a keyboard 903. The screen displays widgets 904-908 for applications available to the user. The user selects the GMWS (Generic Mobile Web Services) client application 908 which causes the PDA 909 to display the splash screen 910 for the GMWS application. The PDA 911 then displays a pull down menu 912 including: Hide Menu, Login, Settings 913, About and Close options. The user selects the Settings 913 option. This results in FIG. 10, the PDA 1000 displaying a settings screen for logging onto the GMWS application. The user enters his ID and Password, the PDA 1001 now displays a pull down menu 1002 including Hide Menu, OK 1003, Cancel and Close options. The user selects OK 1003. Referring to FIG. 11 the PDA 1100 now displays a pull down menu 1102 including: Hide Menu, Login 1103, Settings, About, and close options. The user selects the Login 1103 option. Once logged in, the PDA 1101 now displays 1104 a services list retrieved from the WS Registry 324 using the associated metadata. The options include FastPath 1105 and Services 1106. The list of Services 1106 include Mail, People Finder, Search 1107, StockQuote and Weather web service options. The user selects Search 1107. Referring now to FIG. 12, the PDA 1200 now displays a prompt 1202 "Question" followed by the user's supplied input "what's acme helpdesk number?". The GMWS manager takes the web service request, processes it and sends the response 1204-1207 back to the user's PDA 1201 screen 1203.

Figure 13:
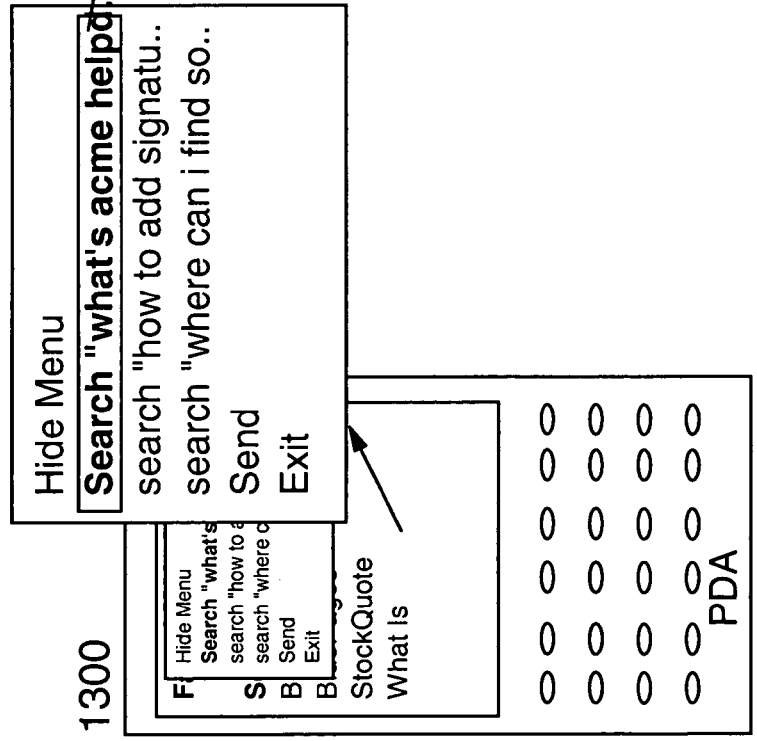
FIG. 13 is a PDA portrayed in a subsequent view.

Referring to FIG. 13, finally the PDA 1300 displays recent search questions 1302 previously submitted by the user as context menus 1301. These are preferably stored at the PDA and are available at future sessions.

Example XML

Example XML code for the request 603 for Web Services list with personalized profile from the GMWS Client 310 to the GMWS Manager 320 is shown in Table 1. The profile describes what kind of service that the user is interested in. Table 1 shows an example profile for a user who is interested in getting stock and search services, as well as location based services. This profile can be used to filter out the unwanted services.

TABLE 1

```
<profile> location="true">
    <service>stock</service>
    <service>search</service>
</profile>
```

The Web Services Registry 324 maintains the list of Web Services including metadata. An example content of such a registry is shown in Table 2. The meaning of symbols in Table 2 are shown in Table 3:

TABLE 2

```
<services>
    <service name="Search"
        url="http://www.acme.com/services/search"
        urn="acme-search"
        method="getSearchResult"
        returnType="String"
        credentials="y"
        keyword="search"
        help="This is a web service to get answers to your
question. Fast Path command: search 'question'. For example, search
'what is acme help desk phone number'."
        n1="(search|ask)[\s]+.+"
        xsl="search.xsl">
        <param name="Question" show="true"/>
        <param name="Questions to Return" show="false" value="4"
type="java.lang.Integer"/>
        <param name="timeout" show="false" value="30"
type="java.lang.Integer"/>
        <param name="maxLength" show="false" value="256"
type="java.lang.Integer"/>
    </service>
    <service name="Stock Quote"
        url="http://www.acme.com/services/stock"
        urn="acme-stock"
        method="getQuotes"
        returnType = "String"
        credentials="n"
        keyword="quote"
        help="This is a web service to get stock quote.
Fast Path command: quote 'ticker1,ticker2'. For example, quote
acme."
        n1="quote[\s]+.+"
        xsl="">
        <param name="Ticker"/>
    </service>
    <service name="weather"
        url="http://www.acme.com/services/weather"
        urn="acme-weather"
        method="getWeather"
        returnType = "String"
        credentials="n"
        keyword="what's the weather of"
        help="This is a web service to lookup the weather.
Fast Path command: what's the weather of zipcode. For example,
what's the weather of 12345."
        n1="what's the weather of[\s]+[0-9]{5}"
        xsl="">
        <param name="zipcode"/>
    </service>
</services>
```

TABLE 3 service: defines metadata for one web service
  name: name of the web service
  url, urn: endpoint of the web service
  method: name of the operation of the web service
  returnType: type of data returned by the web service
  credentials: defines if the user credential is required by the
  web service
  keyword: keyword used to auto-generate the Fast Path command
  help: help message to be displayed on the device TABLE 3-continued nl: regular expression used to parse Fast Path command
xsl: template used to transform the output of the web service. Optional.
param: defines input parameter for the web service
    name: name of the parameter
    show: flag to indicate if this parameter will be displayed on the client device. The flag is Optional. If it's not defined, the parameter will be shown to the client.
    value: default value to be displayed on the client device. The value is Optional.
    type: type of the input parameter. By default, it's "String".
    Enum: Comma separated enumeration values.

An example of metadata returned 604 to the GMWS client 310 is shown in Table 4:

TABLE 4

```
<services>
    <service name="Search"
            credentials="y"
            keyword="search"
            help="This is a web service to get answers to your question. Fast Path command: search 'question'. For example, search 'what is acme help desk phone number'."
        <param name="Question"/>
    </service>
    <service name="Stock Quote"
            credentials="n"
            keyword="quote"
            help="This is a web service to get stock quote. Fast Path command: quote 'ticker1,ticker2'. For example, quote acme."
        <param name="Ticker"/>
    </service>
</services>
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While a preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer implemented method for providing Web Services to clients by way of a Mobile Web Services manager (MWSM), the method comprising:

based on receiving, by a processor at the MWSM, a list request from a client, sending information for accessing Web Services of a first plurality of Web Services to the client, wherein the information for accessing Web services comprises a list of items and metadata for accessing the Web Services using a fastpath request and an XML request, the list of items comprising a first item corresponding to a name of a Web Service in the first plurality of Web Services and at least a second item corresponding to a command keyword associated with the Web Service in the first plurality of Web Services, wherein the command keyword auto-generates a command to be performed by the Web Service, wherein the information for accessing Web Services indicates a set of information required by a given Web Service to be included by the client when creating each of an XML request and a fastpath request accepted by the given Web Service, and wherein the set of information required by the given Web Service when creating an XML request comprises at least a name of the given Web Service as indicated by the first item in the list of items, and wherein the set of information required by the given Web Service when creating a fastpath request comprises at least the command keyword, as indicated by the second item in the list of items, supported by the given Web Service, wherein the metadata comprises a structure of a dynamic graphical user interface structure, specific to at least one Web Service in the first plurality of Web Services, and configures the client to generate the dynamic graphical user interface based on the structure, wherein the structure comprises at least a name of an input field of the at least one Web Service, and a type of the input field of the at least one Web Service;

wherein based on receiving an XML request from the client at the MWSM comprising both a selection of a Web Service and a service request associated with the selected Web Service, forwarding a corresponding XML request to the selected Web Service identified by the received XML request; and based on forwarding the corresponding XML request, forwarding a response from the selected Web Service to the client; and wherein based on receiving a fastpath request from the client at the MWSM comprising both a command keyword and a service request associated with a Web Service, parsing the fastpath request to identify the Web Service associated with the fastpath request and corresponding request attributes associated with the service request, wherein the identified Web Service is identified based on the command keyword, and wherein the fastpath request comprises the set of information required by the identified Web Service to perform the service request;

determining that the identified Web Service accepts XML requests;

based on determining that the identified Web Service accepts XML requests, creating an XML request, wherein the created XML request includes the corresponding request attributes associated with the service request that have been parsed from the fastpath request and converted into an XML format;

forwarding the created XML request to the identified Web Service; and based on forwarding the created XML request, forwarding a response from the identified Web Service to the client.

2. The method according to claim 1, further comprising transforming the response from the identified Web Service to audio, wherein the audio is forwarded in the forwarding the response from the identified Web Service to the client.

3. The method according to claim 1, further comprising:
discovering the first plurality of web services;
storing a registered indication of the first plurality of Web Services in a local registry of the MWSM, the registered indication identifying the first plurality of Web Services supported by the MWSM, the first plurality of Web Services comprising a second plurality of Web Services;
storing attributes of each of the first plurality of Web Services, the attributes comprising information describing interfaces of corresponding Web services; and
using the stored attributes and the registered indication to create the information for accessing Web Services of the first plurality of Web Services.

4. The method according to claim 1, wherein the list request further comprises a set of user credentials further comprising:
determining the list based on a user predefined profile corresponding to the set of user credentials.

5. The method according to claim 1, further comprising:
based on not having a saved permission for the client to use the identified Web Service, negotiating client permission to use a second Web Service; and
based on obtaining permission, saving the negotiated permission for the client to use the second Web Service.

6. A computer program product for providing Web Services to clients by way of a Mobile Web Services manager (MWSM), the computer program product comprising a non-transitory storage medium readable by a processing circuit and storing instructions for execution by the processing circuit for performing a method comprising:
based on receiving at the MWSM a list request from a client, sending information for accessing Web Services of a first plurality of Web Services to the client, wherein the information for accessing the Web services comprises a list of items and metadata for accessing the Web Services using a fastpath request and an XML request, the list of items comprising a first item corresponding to a name of a Web Service in the first plurality of Web Services and at least a second item corresponding to a command keyword associated with the Web Service in the first plurality of Web Services, wherein the command keyword auto-generates a command to be performed by the Web Service;
wherein the information for accessing Web Services indicates a set of information required by a given Web Service to be included by the client when creating each of an XML request and a fastpath request accepted by the given Web Service, wherein the set of information required by a the given Web Service when creating an XML request comprises at least a name of the given Web Service as indicated by the first item in the list of items, and wherein the set of information required by the given Web Service when creating a fastpath request comprises at least the command keyword, as indicated by the second item in the list of items, supported by the given Web Service,
wherein the metadata comprises a structure of a dynamic graphical user interface structure, specific to at least one Web Service in the first plurality of Web Services, and configures the client to generate the dynamic graphical user interface based on the structure,
wherein the structure comprises at least a name of an input field of the at least one Web Service, and a type of the input field of the at least one Web Service;
wherein based on receiving an XML request from the client at the MWSM comprising both a selection of a Web Service and a service request associated with the selected Web Service, forwarding a corresponding XML request to the selected Web Service identified by the received XML request; and
based on forwarding the corresponding XML request, forwarding a response from the selected Web Service to the client; and
wherein based on receiving a fastpath request from the client at the MWSM comprising both a command keyword and a service request associated with a Web Service,
parsing the fastpath request to identify the Web Service associated with the fastpath request and corresponding request attributes associated with the service request, wherein the identified Web Service is identified based on the command keyword, and wherein the fastpath request comprises the set of information required by the identified Web Service to perform the service request;
determining that the identified Web Service accepts XML requests;
based on determining that the identified Web Service accepts XML requests, creating an XML request, wherein the created XML request includes the corresponding request attributes associated with the service request that have been parsed from the fastpath request and converted into an XML format;
forwarding the created XML request to the identified Web Service; and
based on forwarding the created XML request, forwarding a response from the identified Web Service to the client.

7. The computer program product according to claim 6, wherein based on receiving a fastpath request further comprises:
receiving an audio (voice) fastpath request from the client; and
transforming the received audio into a fastpath text request comprising fastpath text.

8. The computer program product according to claim 7, wherein the method further comprises:
returning the fastpath text request to the client, the returned fastpath text request enabling the client to edit the fastpath text to send an edited fastpath text request.

9. The computer program product according to claim 6, wherein the method further comprises:
transforming the response from the identified Web Service to audio, wherein the audio is forwarded in the forwarding the response from the identified Web Service to the client.

10. The computer program product according to claim 6, wherein the method further comprises:
discovering the first plurality of web services;
storing a registered indication of the first plurality of Web Services in a local registry of the MWSM, the registered indication identifying the first plurality of Web Services supported by the MWSM, the first plurality of Web Services comprising a second plurality of selected Web Services;

storing attributes of each of the first plurality of Web Services, the attributes comprising information describing interfaces of corresponding Web services; and using the stored attributes and the registered indication to create the information for accessing Web Services of the first plurality of Web Services.

11. The computer program product according to claim 6, wherein the MWSM comprises a voice transcription service for transforming audio into text, a fastpath parsing service for parsing fastpath text requests, a web service dispatcher for communicating between the client and web services of the first plurality of web services and a web service registry for storing a registered indication identifying the first plurality of Web Services supported by the MWSM.

12. The computer program product according to claim 6, wherein the list request further comprises a set of user credentials, wherein the method further comprises:

determining the list based on a user predefined profile corresponding to the set of user credentials.

13. The computer program product according to claim 6, wherein the method further comprises:

based on not having a saved permission for the client to use the identified Web Service, negotiating client permission to use a second Web Service; and based on obtaining permission, saving the negotiated permission for the client to use the second Web Service.

14. A system for providing Web Services to clients by way of a Mobile Web Services manager (MWSM), the system comprising:

one or more networks;

a mobile web service manager computer system in communication with one or more Web Service computer systems by way of a network of the one or more networks, the mobile web service manager computer system further in network communication with one or more mobile client computer systems, wherein the mobile client computer system comprises a MWSM, wherein the mobile web service manager computer system is capable of performing a method comprising:

based on receiving at the MWSM a list request from a client, information for accessing Web Services of a first plurality of Web Services to the client, wherein the information for accessing the Web services comprises a list of items and metadata for accessing the Web Services using a fastpath request and an XML request, the list of items comprising a first item corresponding to a name of a Web Service in the first plurality of Web Services and at least a second item corresponding to a command keyword associated with a the Web Service in the first plurality of Web Services, wherein the command keyword auto-generates a command to be performed by the Web Service;

wherein the information for accessing Web Services indicates a set of information required by a given Web Service to be included by the client when creating each of an XML request and a fastpath request accepted by the given Web Service, wherein the set of information required by the given Web Service when creating an XML request comprises at least a name of the given Web Service as indicated by the first item in the list of items, and wherein the set of information required by the given Web Service when creating a fastpath request comprises at least the command keyword, as indicated by the second item in the list of items, supported by the given Web Service, wherein the metadata comprises a structure of a dynamic graphical user interface, specific to at least one Web Service in the first plurality of Web Services, and configures the client to generate the dynamic graphical user interface based on the structure, wherein the structure comprises at least a name of an input field of the at least one Web Service, and a type of the input field of the at least one Web Service;

wherein based on receiving an XML request from the client at the MWSM comprising both a selection of a Web Service and a service request associated with the selected Web Service, forwarding a corresponding XML request to the selected Web Service identified by the received XML request; and based on forwarding the corresponding XML request, forwarding a response from the selected Web Service to the client; and wherein based on receiving a fastpath request from the client at the MWSM comprising both a a command keyword and a service request associated with a Web Service, parsing the fastpath request to identify the Web Service associated with the fastpath request and corresponding request attributes associated with the service request, wherein the identified Web Service is identified based on the command keyword, and wherein the fastpath request comprises the set of information required by the identified Web Service to perform the service request;

determining that the identified Web Service accepts XML requests;

based on the parsed fastpath request, creating an XML request;

forwarding the XML request to the identified Web Service, the XML request comprising the corresponding request attributes including the set of information required by the identified Web Service to perform the service request; and based on forwarding the XML request, forwarding a response from the identified Web Service to the client.

15. The system according to claim 14, wherein based on receiving a fastpath request further comprises:

receiving an audio (voice) fastpath request from the client; and transforming the received audio into a fastpath text request comprising fastpath text.

16. The system according to claim 15, wherein the method further comprises:

returning the fastpath text request to the client, the returned fastpath text request enabling the client to edit the fastpath text to send an edited fastpath text request.

17. The system according to claim 14, wherein the method further comprises:

transforming the response from the identified Web Service to audio, wherein the audio is forwarded in the forwarding the response from the identified Web Service to the client.

18. The system according to claim 14, wherein the method further comprises:

discovering the first plurality of web services;

storing a registered indication of the first plurality of Web Services in a local registry of the MWSM, the registered indication identifying the first plurality of Web Services supported by the MWSM, the first plurality of Web Services comprising a second plurality of Web Services;

storing attributes of each of the first plurality of Web Services, the attributes comprising information describing interfaces of corresponding Web services; and using the stored attributes and the registered indication to create the information for accessing Web Services of the first plurality of Web Services.

19. The system according to claim 14, wherein the MWSM comprises a voice transcription service for transforming audio into text, a fastpath parsing service for parsing fastpath text requests, a web service dispatcher for communicating between the client and web services of the first plurality of web services and a web service registry for storing a registered indication identifying the first plurality of Web Services supported by the MWSM.

20. The system according to claim 14, wherein the list request further comprises a set of user credentials further comprising:
   determining the list based on a user predefined profile corresponding to the set of user credentials.

21. The system according to claim 14, wherein the method further comprises:
   based on not having a saved permission for the client to use the identified Web Service, negotiating client permission to use a second Web Service; and
   based on obtaining permission, saving the negotiated permission for the client to use the second Web Service.

\* \* \* \* \*